Jan. 13, 1970     A. H. SCHEIDING     3,489,640
MANY-FACETED ORNAMENTAL SHEET MATERIAL
Filed Nov. 8, 1966     8 Sheets-Sheet 1
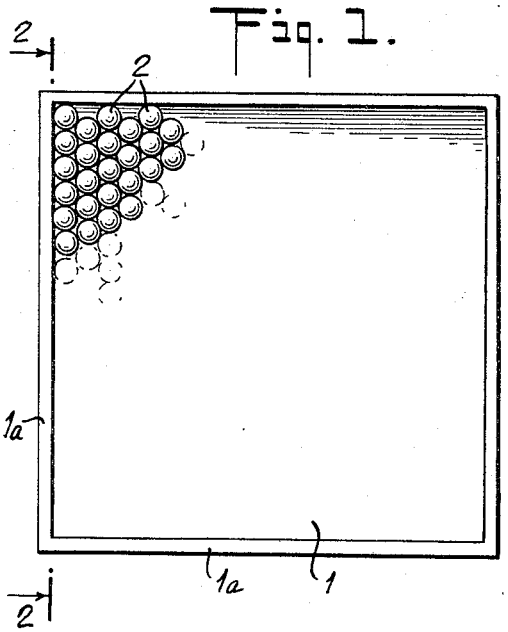
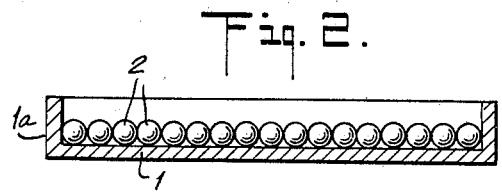
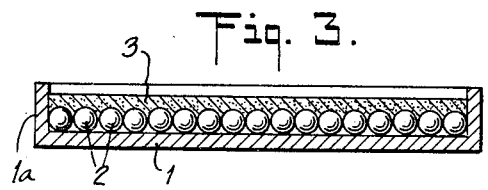
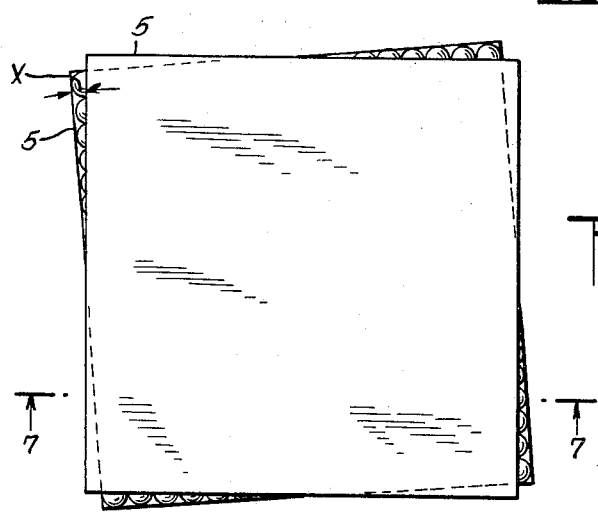
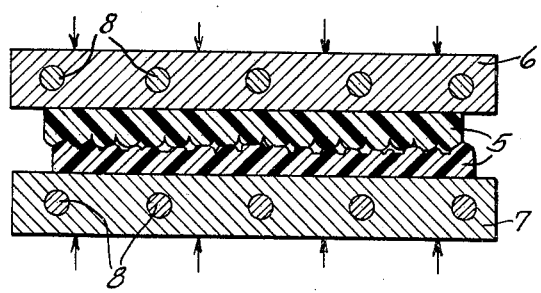
INVENTOR.
ARNO H. SCHEIDING
BY
Lester W. Clark
ATTORNEY Jan. 13, 1970 A. H. SCHEIDING 3,489,640
MANY-FACETED ORNAMENTAL SHEET MATERIAL
Filed Nov. 8, 1966 8 Sheets-Sheet 2
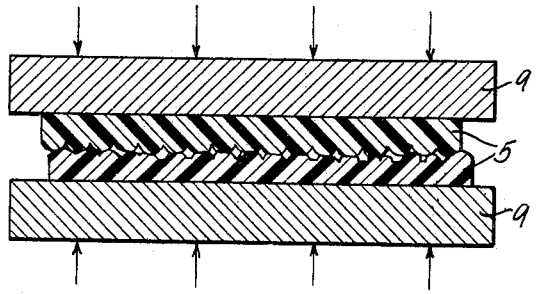
Fig. 8.
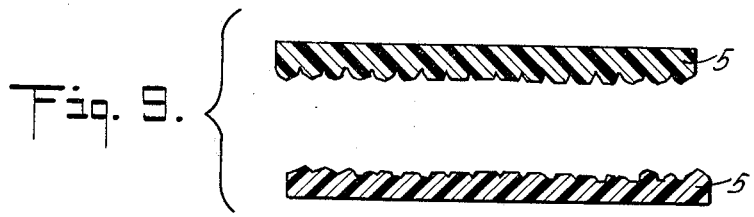
Fig. 9.
Fig. 10.
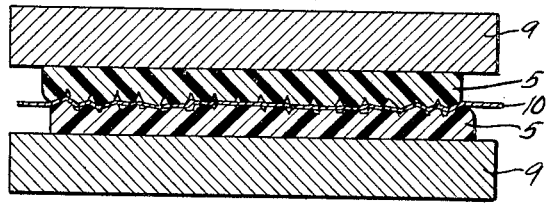
Fig. 12.
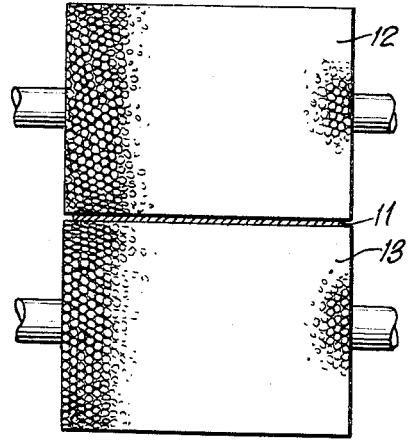
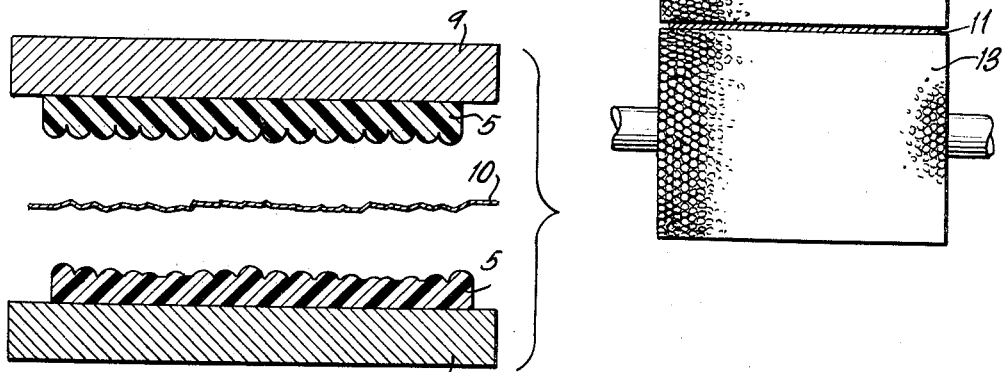
Fig. 11.
INVENTOR.
ARNO H. SCHEIDING
BY Lester N. Clark
ATTORNEY

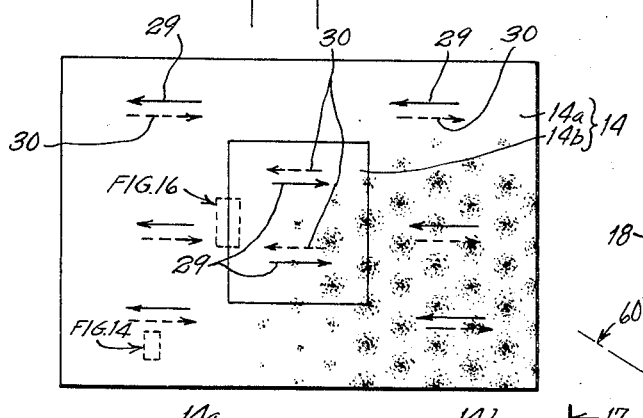
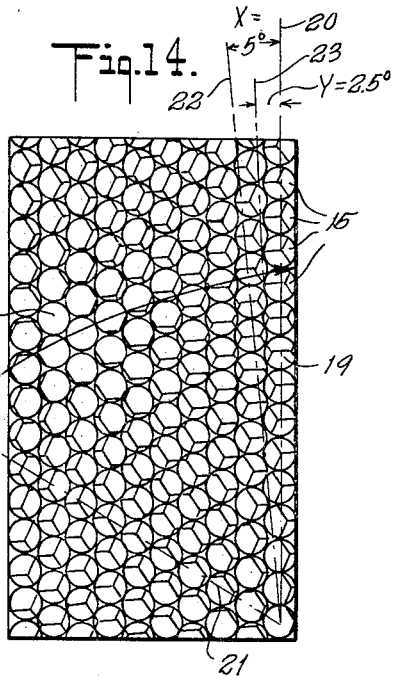
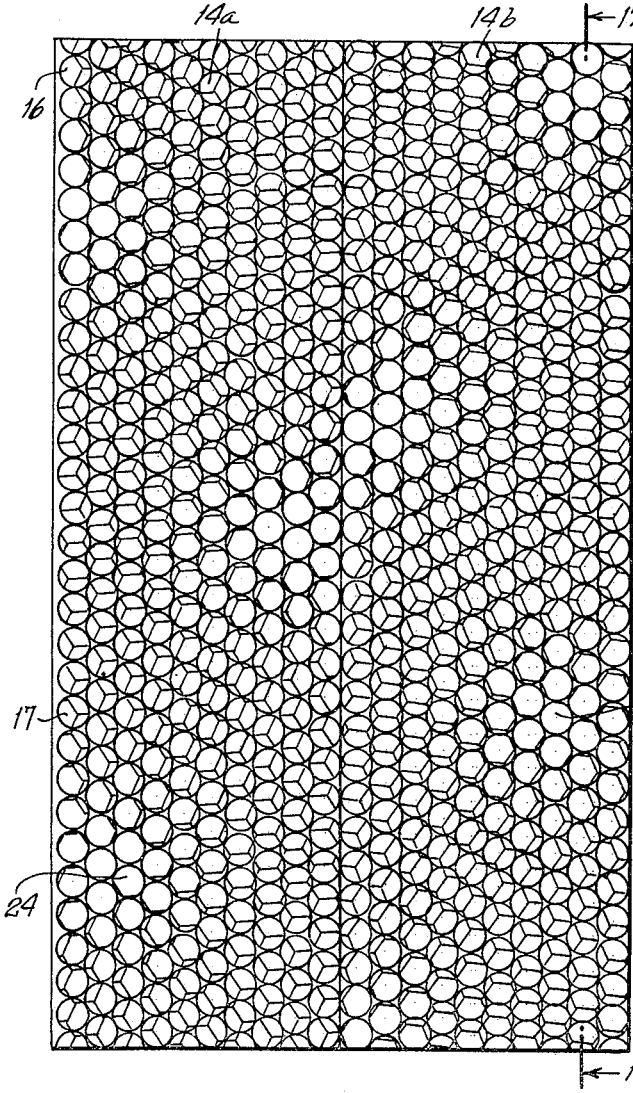
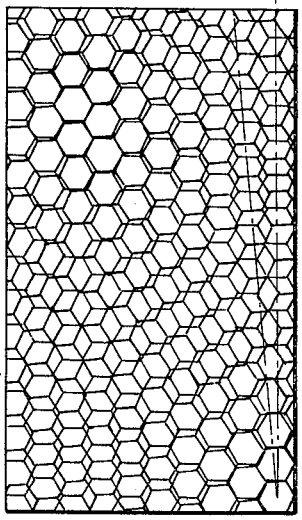

Jan. 13, 1970  A. H. SCHEIDING  3,489,640

MANY-FACETED ORNAMENTAL SHEET MATERIAL

Filed Nov. 8, 1966  8 Sheets-Sheet 4

INVENTOR.
ARNO H. SCHEIDING
BY Lester W. Clark
ATTORNEY

Jan. 13, 1970  A. H. SCHEIDING  3,489,640
MANY-FACETED ORNAMENTAL SHEET MATERIAL
Filed Nov. 8, 1966  8 Sheets-Sheet 5
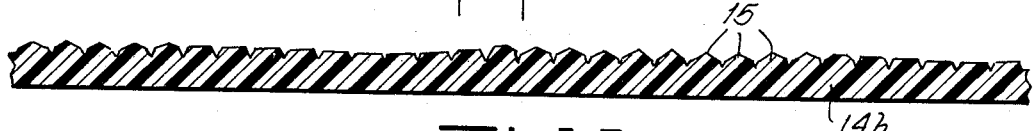
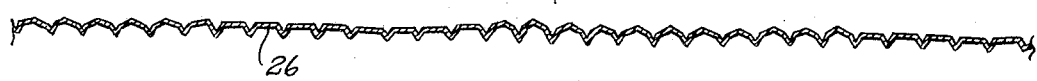
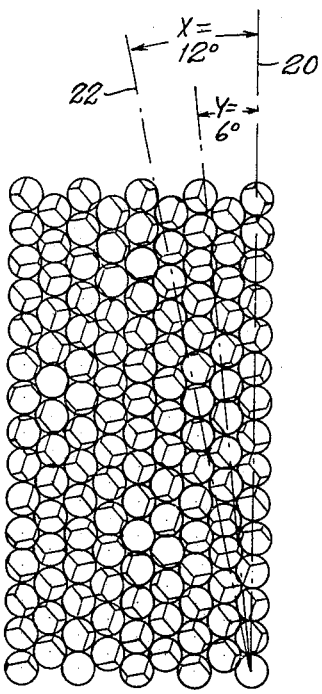
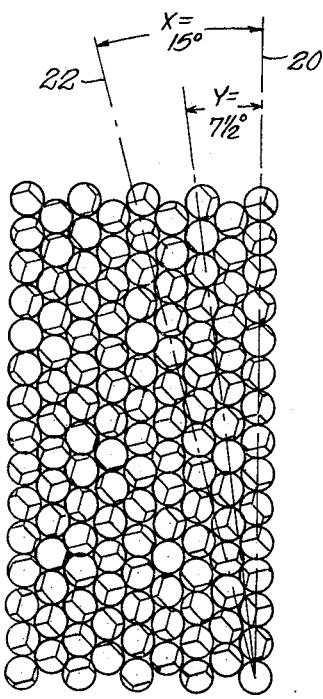
INVENTOR.
ARNO H. SCHEIDING
BY Lester W. Clark
ATTORNEY INVENTOR.
ARNO H. SCHEIDING
BY Lester W. Clark
ATTORNEY Jan. 13, 1970 A. H. SCHEIDING 3,489,640
MANY-FACETED ORNAMENTAL SHEET MATERIAL
Filed Nov. 8, 1966 8 Sheets-Sheet 7
Fig.27.
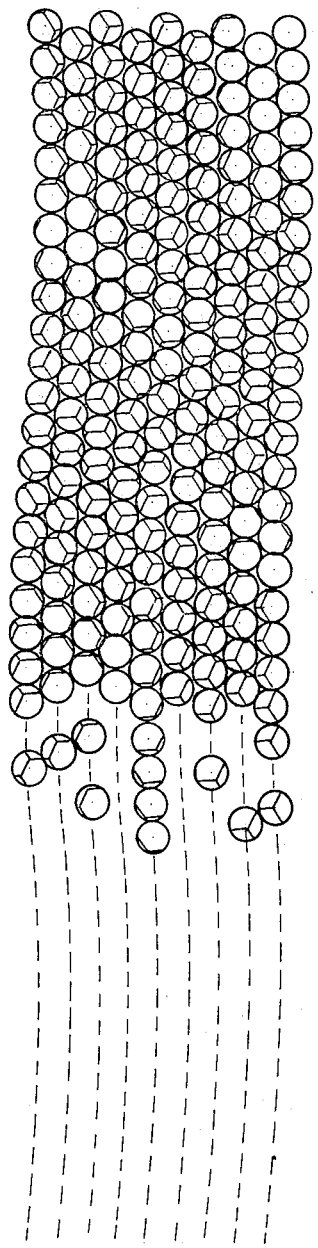
Fig.28.
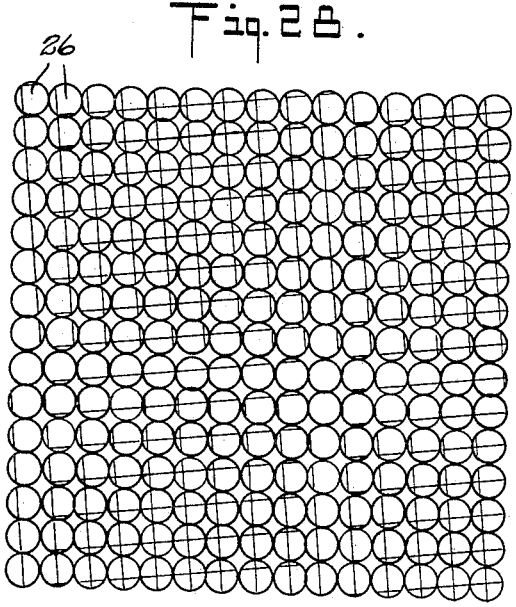
Fig.29. Fig.30. Fig.31.
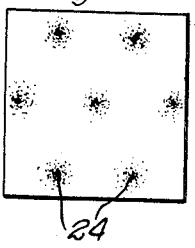 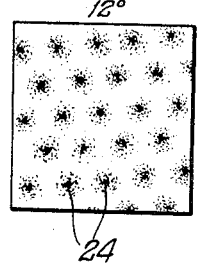 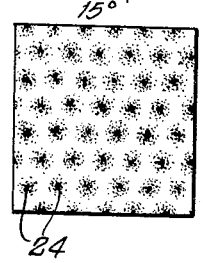
Fig.32. Fig.33.
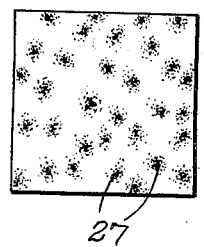 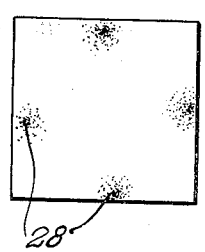
INVENTOR.
ARNO H. SCHEIDING
BY Lester W. Clark
ATTORNEY Jan. 13, 1970　　　A. H. SCHEIDING　　　3,489,640
MANY-FACETED ORNAMENTAL SHEET MATERIAL
Filed Nov. 8, 1966　　　　　　　　　　　　　　8 Sheets-Sheet 8
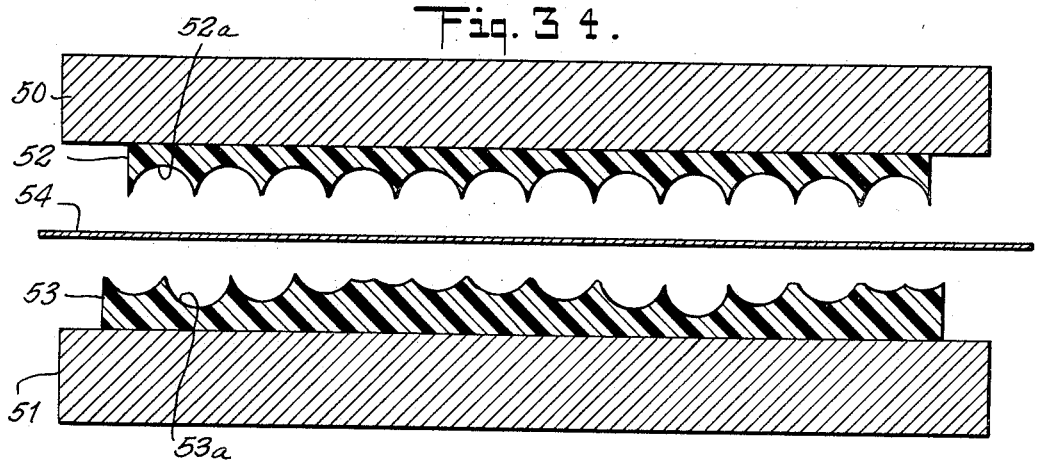
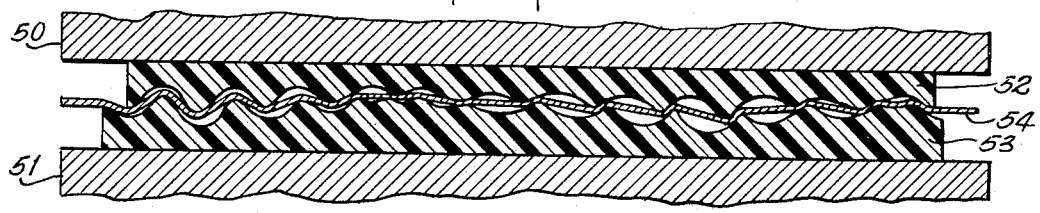
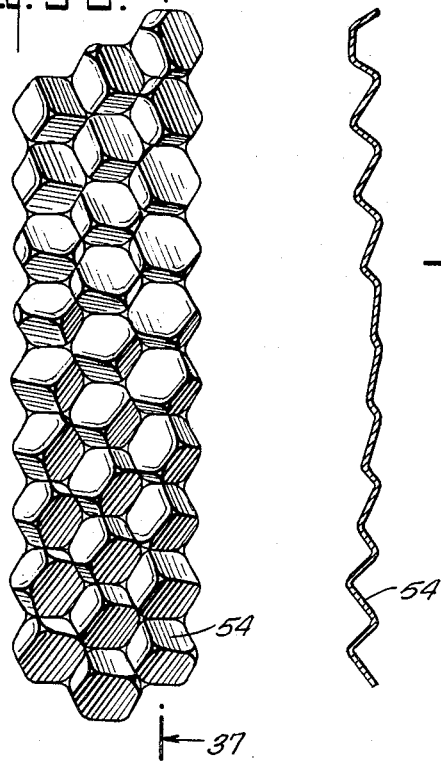
INVENTOR.
ARNO H. SCHEIDING
BY Lester N. Clark
ATTORNEY United States Patent Office 3,489,640
Patented Jan. 13, 1970

3,489,640
MANY-FACETED ORNAMENTAL
SHEET MATERIAL
Arno H. Scheiding, Darien, Conn., assignor, by mesne assignments, to L. E. Carpenter & Company, Wharton, N.J., a corporation of Delaware
Filed Nov. 8, 1966, Ser. No. 592,908
Int. Cl. B32b 3/30, 3/14
U.S. Cl. 161—116                                   17 Claims

ABSTRACT OF THE DISCLOSURE

An ornamental sheet material is made by deforming rounded relief elements arrayed on the sheet so that at least one facet is formed on each relief element and each facet on each relief element has a different contour (i.e., shape, area, tilt or orientation) from every facet on every adjacent relief element. When the contours of facets in any row of relief elements vary progressively along the row, interesting highlights are produced.

The sheets may be formed by pressing together two sheets, each having an array of rounded relief elements, so that the rows of elements on one sheet are at a selected angle to the rows on the other sheet. The sheets may be of plastic and are deformed under heat and pressure.

---

This invention relates to ornamented structures, especially sheet material structures, having relief elements formed in one surface thereof in an array effective to produce to an observer unique patterns of highlights. The invention further relates to the making of such ornamented structures by methods adaptable to mass production techniques, especially embossing.

The embossing of sheet material is commonly carried out by compressing the material to be embossed between two compression members, typically either generally flat plates, or they may be cylindrical rollers. One of the compression members has formed in its surface the negative of the pattern to be embossed in the material. The second embossing member sometimes has a completely plain surface, and sometimes has a positive pattern, which is the reverse of and in register with the negative pattern on the other embossing member. Whether flat plate embossing or roller embossing is used, the plates or rollers are in contact with the material being embossed for only a limited period of time. This is especially true with roller embossing, where the two rollers are running at a fairly rapid speed, and the material is compressed between the two rollers for only an instant. Because of the shortness of time during which the embossing forces are applied, the material being embossed tends to return to its original form after it leaves the embossing plate or roller. For example, where the embossed material comprises a backing sheet such as cotton duck coated on one side with thermoplastic material such as polyvinyl chloride, the plastic material is heated as it approaches the embossing rolls so as to make it subject to deformation by the rolls. The rolls themselves are cooled and therefore tend to set the material as it passes through them. However, the setting is not instantaneous, as is the contact between the two rolls, so that these is some "slump" or change in contour of the material after it leaves the embossing rolls. Hence, in order for a pattern to be successfully reproduced by embossing, the pattern must not be critical as to the specific contours of the individual relief elements in the pattern, since those elements are inexactly reproduced in the embossing process.

An object of the invention is to make an ornamented structure having an improved array of relief elements in a surface, which array is effective to produce a distinctive pattern of highlights to an observer.

Another object of the invention is to provide such an ornamented structure in which the highlights are regularly or irregularly distributed, according to a predetermined pattern.

A further object is to provide such an ornamented structure in which contrasting areas of a surface are provided with different embossed arrays of relief elements such that the respective patterns of highlights produced in the contrasting areas appear to move at different speeds upon the occurrence of relative motion between any two elements of the three-element optical system consisting of a source of light, the surface, and an observer's eye.

A further object of the invention is to produce such an ornamented structure having contrasting areas with different arrays of relief elements, such that the respective patterns of highlights in the two areas appear to move in different directions upon the occurrence of relative motion between any two elements of the three-element optical system consisting of the source of light, the surface, and the observer's eye.

Another object of the invention is to provide improved methods of making ornamented structures of the type described.

A further object is to provide an improved method of making embossed material having ornamented structural surfaces of the type described.

Another object is to provide an improved method of making an embossed plastic coated backed sheet material having arrays of relief elements of the type described.

Another object is to provide a method of making embossed, thin sheet material having arrays of relief elements of the type described.

The foregoing and other objects of the invention are attained in the articles of manufacture and the methods of making those articles which are described herein. Such an article comprises, in at least one area of a surface, an array of knob-shaped relief elements, arranged in at least one row. The knob-shaped relief elements may appear either in their positive form as protuberances from the general surface or in their negative form as recesses in the general surface. Each knob-shaped relief element has at least one facet, which is nominally a plane surface on the relief element, but which may, as to any particular facet, depart somewhat from a plane and consequently may be either convex or concave, but which is without any discontinuity of surface within its boundary. Along each row of relief elements, each facet of one relief element differs in contour from the facets of the next adjacent relief elements in the row. Furthermore, each facet of a relief element is different from all the other facets of that relief element both as to orientation and as to tilt. The differences in contour between facets of adjacent relief elements may appear as differences in area, tilt, shape or orientation, or in any combination including two or more of those qualities.

In many arrays of relief elements constructed in accordance with the invention, there is only a small change in the contour of the facets between one relief element and the next, and the change may be observed to vary progressively from each relief element to the next, along the row. In other arrays of relief elements constructed in accordance with the invention, the change in contour from one element to the next is so great that it cannot readily be recognized as a progressive variation. Where there is an observable progressive variation present, it may also be observed that there is a shift in the phase of the progressive variation from one row to the next.

The variation in the contour of the facets may be repeated substantially in cycles along a row, each cycle extending over a plurality of relief elements. This cyclical repetition may appear in one extreme form as an alternation of facet contour from one relief element to the next along the row. Where the cycle consists of only a small number of relief elements, as in the alternation case where the number of elements in a cycle is two, there is no readily apparent variation.

The number of relief elements in a cycle between substantial repetitions of a particular relief element contour is a principal factor in determining the particular pattern of highlights produced by a given array of relief elements. It is not always convenient, nor easy to count the number of relief elements in a cycle. For example, that number may be greater than the number of relief elements in a particular row of a pattern area. The number of relief elements in a cycle may be measured by measuring the angle between the center line of the row of relief elements and a line drawn through the centers of those facets on adjacent relief elements which are correspondingly oriented, i.e., those facets whose variation changes least from one relief element to the next. The relief elements are typically arranged in intersecting rows whose center lines define an angle $n$. In such an array of relief elements constructed in accordance with the invention, the angle between the center line of a row and the line drawn through the centers of correspondingly oriented facets (hereinafter termed the facet-row angle) is less than $n/4$. As that angle approaches zero, the longest cycle of progressive variation is encountered. As the facet-row angle increases from zero to $n/4$, the period of the cycle decreases (in terms of the number of relief elements between successive repeats of a particular contour). When the facet-row angle is $n/4$, the number of relief elements in a cycle is at a minimum, and thereafter increases as the facet-row angle increases, as explained in greater detail below.

It has further been found that an important difference in the patterns constructed in accordance with the invention depends upon the direction of angular displacement of the line through the centers of the facets with respect to the center line of the row. If a pattern in a surface has one area in which the line through the centers of the facets is displaced clockwise from the center line of the row and a second area in which the line through the centers of the facets is displaced counter-clockwise from the center line of the row, it will be found, upon relative movement between two elements of the three-element optical system consisting of a light source, the surface, and the eye of an observer, that the arrays of highlights produced in the two pattern area appear to the observer to move in opposite directions.

As the facet-row angle shifts between zero and $n/4$, the spacing of the highlights varies from a very wide spacing, practically infinite at 0°, to a very close spacing (e.g., up to about five relief elements). Furthermore, if two areas having different facet-row angles with the same sign are placed in contrasting positions on the surface of a material, and relative motion is introduced between any two elements of the three-element optical system consisting of a light source, the surface and the eye of an observer, the highlights which are spaced farther apart will appear to move faster than the highlights spaced closer together.

The highlights are distributed over a large number of relief elements in those patterns where the facet-row angle is small. Where the facet-row angle is near its maximum, so that the repeated cycle consists of a small number (about five or six) of relief elements, each highlight appears as an individual facet. Straight rows or regularly curved rows of elements produce a regular pattern of highlights, whereas irregularly curved rows of elements produce an irregular pattern of highlights.

Several methods of forming a structure with a surface of relief elements as described above are disclosed below. All of those methods start with two pressing members (sheets or cylinders) having a surface formed with a regular array of relief elements, e.g., hemispherical protuberances. Preferably, the arrays on the two pressing members have the same arrangement of relief elements, all of which are of the same diameter. At least one, and preferably both, of the two pressing members must be of deformable material, e.g., thermoplastic material.

If the pressing members are sheets, they are placed with their protuberances against each other and with the rows of protuberances on one sheet rotated with respect to the rows on the other, about an axis perpendicular to both sheets, so that almost all protuberances of one sheet are misaligned with respect to the protuberances on the other sheet. A misalignment of translation may also be introduced, but it is not necessary, while a misalignment of rotation is necessary. The two sheets are then pressed together, deforming the protuberances on the deformable sheet and a permanent impression of that deformation is made. The pressure is then removed from the two sheets and they are separated.

The permanent impression may be formed in one or both of the sheets themselves, if the sheet or sheets to be so formed are of thermoplastic material, by heating the sheets while they are pressed together and then removing the heat, allowing the sheets to cool while the pressure is maintained. Alternatively, the permanent impression may be formed in a sheet of foil, paper or other deformable material inserted between the sheets while they are under pressure. In that event, no heat may be necessary, depending upon the characteristics of the thin sheet of foil or other deformable material.

If the pressing members are cylinders, they are rotated in rolling contact with each other, with their axes parallel. The rows of protuberances on one of the cylinders must be non-parallel to the rows of the other cylinder, so that almost all the protuberances on one cylinder are misaligned with respect to the protuberances on the other cylinder. Again, a misalignment of translation may be introduced. The permanent impression of the deformation is usually made, in the case of cylindrical pressing members, by passing a strip of deformable material into the bite between the contacting cylinders.

The permanent impression formed by either of these methods may be used to manufacture embossing plates by known techniques. For example, an electroformed plate may be made from any of the permanent impressions described above. This electroformed plate will have a negative impression of the deformed protuberances on it. That electroformed plate may be used to emboss a positive impression of the deformed protuberances on sheet material. Alternatively, the electroformed plate with the negative impression may be used to produce an electroformed plate with a positive impression and the latter may be used to emboss sheet material with a negative reproduction of the deformed protuberances.

The pressing members having regular arrays of protuberances may be formed by known techniques. One such technique is to confine an array of balls such as are used in ball bearings within a wall and make a plastic mold of the resulting array of hemispheres. An electroformed plate may be then made on this mold, this plate having a positive reproduction of the hemisphere surface. It may be used to electroform a negative plate of the hemisphere pattern. The negative electroformed plate may then be used to mold or emboss the positive hemisphere pattern in two sheets of thermoplastic material, which may be the two sheets with which the method described above is started.

Other objects and advantages of the invention will become apparent from a consideration of the following specification and drawings, taken together with the accompanying claims.

In the drawings:

FIG. 1 is a plan view illustrating an apparatus used in the first step of forming an ornamented sheet material in accordance with the invention;

FIG. 2 is a sectional view taken on the line 2—2 of FIG. 1;

FIG. 3 is a view similar to FIG. 2, illustrating the further step in the process;

FIG. 4 is a view similar to FIG. 3, illustrating the next step in the process;

FIG. 5 is a view similar to FIG. 4, illustrating a further step in the process;

FIG. 6 shows a still further step in the process, in which two sheets of deformable material formed in accordance with the step of FIG. 5 are superimposed with a slight angular displacement;

FIG. 7 is a cross-sectional view taken on the line 7—7 of FIG. 6, showing the two sheets of FIG. 6 subjected to heat and pressure;

FIG. 8 is a view similar to FIG. 7 showing the subsequent step, in which heat is removed and the pressure remains effective;

FIG. 9 is a view illustrating a step subsequent to the step of FIG. 8, in which the two sheets are separated;

FIG. 10 is a view similar to FIG. 7, illustrating a modified process for producing a sheet material in accordance with the invention;

FIG. 11 is a view similar to FIG. 10, illustrating a further step in the modified process;

FIG. 12 is an elevational view showing a process similar to FIGS. 10 and 11, using two contoured embossing rolls;

FIG. 13 is a plan view of a sheet material formed in accordance with the invention, showing diagrammatically the movement of the highlight patterns in various portions of the sheet material;

FIG. 14 is a view on a considerably enlarged scale, showing a small area of the sheet material in FIG. 13;

FIG. 16 is a view similar to FIG. 14, but showing a region where two contrasting pattern areas lie adjacent each other;

FIG. 17 is a cross-sectional view taken on the line 17—17 of FIG. 16;

FIG. 18 is a view similar to FIG. 17, showing a sheet material bearing the negative of the pattern of FIG. 17;

FIG. 19 is a view similar to FIG. 14, showing a pattern in which the lines through the centers of the facets extend at an angle of 12° with respect to the center lines of the rows of relief elements;

FIG. 20 is a view similar to FIG. 14, in which the angular displacement is increased to 15°;

FIG. 22 is a cross-sectional view of a thin sheet material made according to the methods of FIGS. 10–12;

FIG. 23 is a plan view of the material of FIG. 19;

FIG. 27 shows a pattern similar to those of FIGS. 14, 19 and 20, except that the rows of relief elements are slightly curved;

FIG. 28 shows a pattern similar to that of FIG. 14, except that the relief elements are arranged in rows making angles of 90° with one another instead of 60° as in FIG. 14;

FIG. 29 is a view corresponding to FIG. 14, but on a much smaller scale, showing the array of highlights produced by the pattern of FIG. 14;

FIG. 30 is a view similar to FIG. 29, but showing the array of highlights produced by the pattern of FIG. 19;

FIG. 31 is a pattern similar to FIG. 29, but showing the array of highlights produced by the pattern of FIG. 20;

FIG. 32 is a view similar to FIG. 29, but showing the array of highlights produced by the pattern of FIG. 27;

FIG. 33 is a view similar to FIG. 27, but showing the array of highlights produced by the pattern of FIG. 28;

FIG. 34 is a cross-sectional view illustrating an initial step of making a modified form of pattern;

FIG. 35 is a cross-sectional view illustrating a subsequent step in the method of FIG. 34;

FIG. 36 is a fragmentary plan view of the resulting pattern; and

FIG. 37 is a cross-sectional view on the line 37—37 of FIG. 36.

Figure 15:
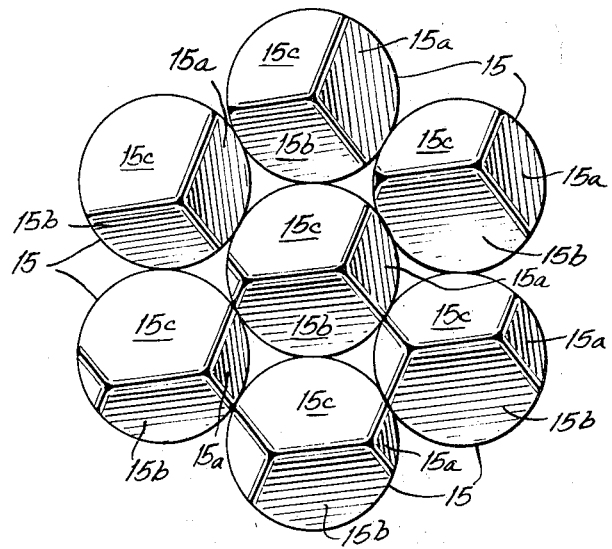
FIG. 15 is a view of an even more greatly enlarged scale, showing an even smaller area of the sheet material in FIGS. 13 and 14.

It is believed that the invention will best be understood by first describing the presently preferred method of producing a sheet material in accordance with the invention, although as will be pointed out below, the more important aspects of the invention relate to the finished product rather than to the method by which it is produced.

FIGS. 1 TO 9

FIG. 1 illustrates a square receptacle 1 open at the top and having side walls 1a in which are arranged an array of balls 2. The balls 2 may be, for example, steel bearing balls. Alternatively, they may consist of any other suitable material as long as their diameter is reasonably uniform. It may be seen that in FIG. 1 the balls are arranged in what may be termed a hexagonal array, since each ball is surrounded by a group of six other balls whose centers are located at the apices of a regular hexagon. It should be understood that the entire container 1 has its bottom surface covered with the balls, which are closely confined and held in contact with one another by the side walls 1a.

After the array of balls 2 is assembled, a layer 3 of thermoplastic material is poured over the balls, as illustrated in FIG. 3 and is allowed to set. After the thermoplastic material has set, it is stripped off the balls, and then has an appearance such as shown in FIG. 4. Any projections of thermoplastic material below the upper hemisphere of the balls is removed. A plate 4 of copper or other suitable metal is then formed on the sheet 3 by electroforming. Briefly, this consists in silvering the pattern surface by any of the techniques commonly used in making mirrors or the like, and then electroplating on the silvered surface to build up a desired thickness of material, thereby forming a plate such as that shown at 4 in FIG. 5. The plate 4 may be used to electroform a negative mold, having a form similar to that of the sheet 3 but in stiff material, e.g., copper. That negative mold may then be used to form plastic sheets having a positive contour such as that of the plate 4 in FIG. 5. It may be noted that the contour of this sheet is an array of hemispheres in FIG. 1.

Two such deformable sheets, shown at 5 in FIG. 2, are placed together with their hemisphere covered faces in abutting relationship and with the sheets angularly displaced by an angle X. It is not necessary that the sheets themselves be so angularly displaced, but only that the rows of hemispheres on one sheet are so angularly displaced with respect to the rows on the other sheet. If the rows on both sheets have the same angular relation with respect to the sheet edges, the effect is accomplished by angularly displacing one sheet with respect to the other. It is necessary that at least one of the sheets be of material which is deformable under pressure. It is presently preferred to have both the sheets of deformable material, although patterns can be produced, within the broader aspects of this invention, by using one rigid sheet and one deformable sheet.

While there may be some translational shift between the hemisphere patterns of the two sheets, the presence or absence of that type of shift is not important. It is important that there be a rotational shift between the patterns on the two sheets, as illustrated by the angle X in FIG. 6. The two sheets 5 are then placed between the plates 6 and 7 of a press. At least one of the plates 6 and 7 must be provided with heating elements 8. Although the press illustrated has heating elements in both of the pressure plates, satisfactory results may be secured with heating elements in only one plate. The sheets 5 are then subjected to sufficient heat and pressure to render the material plastic. For example, using polyvinyl chloride as the plastic material, a pressure of 5,000 p.s.i. and a temperature of 300° F. has been found to be satisfactory. The particular temperature, pressure and duration of the time of application of the high temperature will depend on the characteristics of the particular plastic material used. During the application of this heat and pressure, those hemispheres which are in contact with hemispheres on the opposite sheet are deformed by that contact.

After the heat has been applied for a sufficient length of time, usually of the order of ten or twenty seconds, the sheets 5 are removed from between the heated plates and are placed between a pair of unheated plates 9, as shown in FIG. 8, and are held there under continuing pressure until the sheets 5 have cooled substantially to room temperature. The cooling of the deformed sheets under pressure sets the deformation and establishes a permanent impression of the deformed sheets.

The pressure plates 9 are separated, and the sheets 5 may then be pulled apart, as shown in FIG. 9. The sheets 5 may be slightly adhered to each other, and force may be necessary to pull them apart. The sheets 5 at this time have formed on their surface a pattern in accordance with the invention, which pattern is described in greater detail below in connection with FIGS. 13 to 16.

FIGS. 10 AND 11

These figures illustrate an alternative method of forming a pattern in accordance with the invention. In this alternative method, the pattern is formed in a thin sheet material illustrated at 10, such as paper, metal foil, or the like. Two sheets of hemispherically formed material 5, exactly similar to the sheets 5 of FIG. 6 are used, and are placed with their hemispherical faces toward each other and the thin sheet material 10 between them. Again, it is necessary that the rows of hemispheres on one of the sheets 5 be displaced angularly with respect to the rows on the other sheet. The two plates 5, with the thin material 10 between them, are placed between unheated pressure plates 9 of a press, and pressure is maintained for a sufficient length of time to deform both the hemispheres on the sheets 5 and the thin sheet material 10, which is compressed between them.

The pressure plates 9 are then separated, at which time the sheets 5 resiliently return to their original contours, while the sheet 10 retains the deformed contour into which it has been forced by sheets 5. The general contour of the pattern produced on the sheet 10 is essentially the same as that produced on the sheets 5 in FIG. 9, except that the thin sheet material 10 has some elasticity and so is restored slightly toward its original flat contour. Hence, it does not follow the variations in the contour of the deformed hemispheres as closely as in FIG. 9, so that the angles are more rounded and the hills and valleys in the material are hence less sharply defined.

FIG. 12

This figure illustrates a method of embossing thin strip material 11 similar to the foil or paper 10 of FIGS. 10 and 11, in a continuous process between two embossing rolls 12 and 13. The embossing roll 13 has formed on its surface a pattern of hemispherical relief elements corresponding generally to the pattern of the balls 2 in FIG. 1, with the rows of relief elements extending at right angles to planes passing through the longitudinal axis of the roll. The embossing roll 12 has formed on its surface a similar pattern, except that the rows of hemispherical elements are skewed slightly with respect to planes passing through the axis of the roll. The angle of skew corresponds to the angle X in FIG. 6. The relief elements on at least one of the two rolls 12 and 13 must be of deformable material, although it is preferred to make them both of deformable material. A continuous strip of thin sheet material 11, running between two embossing rolls has formed in its surface a pattern of relief elements (shown in FIGS. 23–26) similar to that formed in the sheet 10 of FIGS. 10 and 11 and distinctly different from either of the hemispherical patterns on the rolls 12 and 13.

FIGS. 13 TO 18

FIG. 13 shows a small scale view of a sheet material 14 having a peripheral design area 14a surrounding a central design area 14b. The pattern in a fragment of the peripheral design area 14a is illustrated in some detail in the enlarged FIG. 14. A smaller fragment of that area is enlarged to an even greater extent in FIG. 15. The pattern in fragment extending across the boundary of the areas 14a and 14b is illustrated in the enlarged FIG. 16.

Each of the design areas 14a and 14b are substantially covered by an array of relief elements 15, which are seen as individual elements in enlarged FIG. 14. Seven of the elements are shown in enlarged detail in FIG. 15. These elements are arranged in parallel rows. The base cross-sectional areas of all the relief elements 15 are equal. The base cross-sectional area may be defined as the cross-sectional area of the relief element taken on a plane at the base of the element, where it joins the general surface of the complete pattern. In the case of cylindrical patterns, the section is taken on a curved surface conforming to the general cylinder of the pattern, at the same relative location on the relief element.

Each element has the form of a hemisphere which has been flattened by the formation of one or more light reflecting facets, as shown at 15a, 15b, and 15c in FIG. 15. Each facet in this particular design has the contour of a fragment of a hexagon. Note that the facets 15a along each row of elements 15 differs slightly in contour from the most nearly corresponding facets of the next adjacent relief elements. As illustrated by the shading in FIG. 15, each facet on a relief element is oriented in a direction different from each other facet thereof. Depending upon the nature of the pattern element used to generate the final pattern (in the present instance, that generating element was a hemisphere), the difference in contour between the facets of adjacent relief elements may appear as a difference in area, tilt, shape or orientation, or any combination thereof. In the relief elements illustrated in FIG. 15, the contour difference varies as to all of these qualities. By "tilt" is meant the angle of the plane of the facet with respect to the general plane (or other principal geometric surface) of the material on which the relief surface is formed. By "orientation" is meant the angular position of the centroid of the facet in azimuth with respect to the center of the relief element.

It may be seen that the contour difference between the facets of adjacent relief elements varies progressively along each row of relief elements. For example, considering the row of relief elements 15 along the right-hand edge of FIG. 14, it may be seen that the facets 15a nearest the right-hand edges of the relief elements decrease progressively in area from the top toward the bottom of the row. Beginning at the top of the row, the right-hand facet 15a is perhaps the largest of the three facets. Proceeding down the row, the right-hand facet becomes progressively smaller until about the middle of the row it has disappeared. This progressive decrease in area is accompanied by a corresponding change in shape. Furthermore, as best seen in the middle vertical row of relief elements in FIG. 15, the angle of tilt of the facet 15a with respect to the general plane of the material becomes steeper as the area becomes smaller.

In that same row, there is very little change in orientation of the facets 15a, although a change in orientation of the facets 15b may be observed. Near the top of FIG. 14, the facets 15b appear at the lower left of each of the relief elements 15. Proceeding down the row, the facets 15b gradually move across the relief elements and near the bottom are at the lower right-hand side of each relief element.

The progressive variation of the facets along each row is cyclical in the patterns of FIGS. 13 to 17. This cyclical variation can be seen in the row along the left-hand side of FIG. 16, where the facets on the relief element 16 near the top of the row are substantially repeated on a relief element 17 about two-thirds of the way down the figure from the top. The number of relief elements between two elements, such as the elements 16 and 17, which have substantially identical facets, is hereinafter referred to as the period of the cycle of variation. In FIG. 17, there are nineteen relief elements in the repeated cycle. In the case of some relief elements, there will be substantially only one facet appearing, as in the case of the facet 18 in FIG. 14. Some of the other relief elements will have more than three. See, for example, the relief element 19 in FIG. 14, which has four facets.

The relief elements 15 in FIG. 14 are arranged side by side so as to produce a pattern of intersecting rows whose center lines define an angle of 60°. For example, the center line 20 through the row of relief elements extending vertically along the right-hand edge of FIG. 14, makes an angle of 60° with the center line 21 extending through a diagonal row of relief elements. The angle between rows of relief elements, hereinafter referred to as the angle $n$, is determined by the angle between the rows of relief elements in the original generating pattern. For example, in FIG. 1, it may be seen that the angle between intersecting rows of the balls 2 is always 60°. These balls define the generating pattern for the final pattern of FIG. 14. In FIG. 6, the angular displacement between the two sheets 5 is identified as the angle X. In the pattern of FIG. 14, the angle X corresponds to the angle of 5° appearing between the center line 20 and a center line 22 drawn through the centers of a row of fragmented hexagons defined by groups of adjacent facets on the relief elements 15.

The center line 23 in FIG. 14 is drawn through the centroids (centers of figure) of a row of correspondingly oriented facets on the relief elements 15. In order to construct the center line 23, first select a particular facet on a particular relief element chosen at random, and determine its centroid. Then, moving along one of those rows of relief elements which intersect at the chosen relief element, select the most nearly correspondingly oriented facet on the next adjacent relief element, and determine its centroid. A line drawn through those two centroids will intersect the center line of the row of relief elements at an angle $Y=X/2$. If this line is extended, it will pass through the centroids of substantially all the facets which it crosses. This angle, termed the facet-row angle and identified as the angle Y, is always one-half of the angle of displacement X of the two generating patterns. In the case of FIG. 14, this angle is 2½°, being one-half of the angle of displacement X, which is 5° in the pattern of FIG. 14.

In order to define the highlight producing structures of the invention by reference to the structures themselves, rather than by the method of creating them, the effect is described and claimed herein not in terms of the angle of displacement X of FIG. 6, which is a characteristic of the method of reproduction, but rather by the facet-row angle Y of FIG. 14 which may be measured from the material itself and is not related to the manner by which the pattern was produced.

Figure 21:
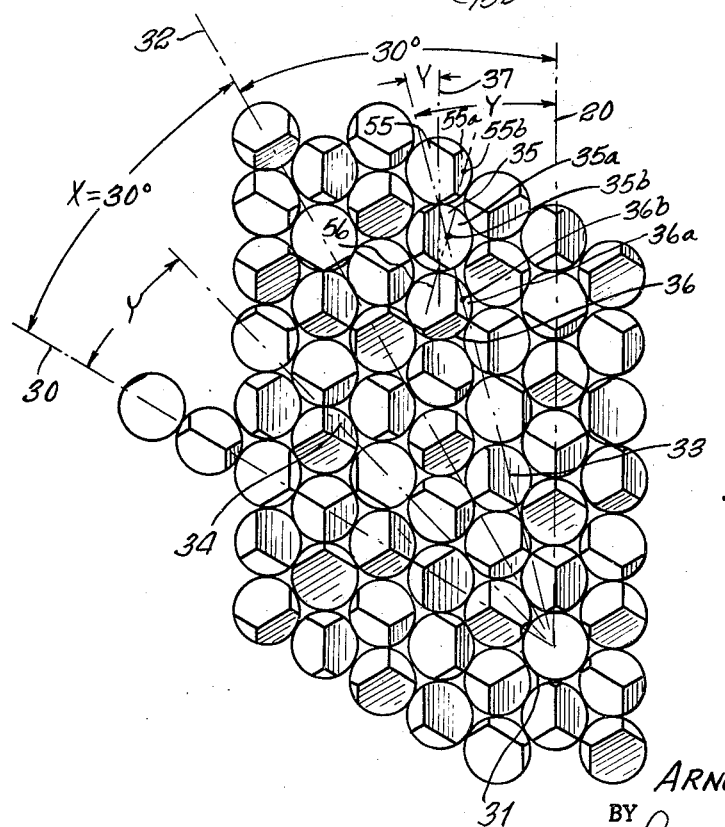
FIG. 21 is a view similar to FIGS. 19 and 20, but on a larger scale, showing a pattern in which the angular displacement is increased to 30°.

As the angle X is increased from zero, shifting the center line 22 counter-clockwise with respect to the center line 20, the length of the periods of cyclical variation of the facets along the rows of relief elements changes from infinity when $X=0°$ to a minimum of approximately four or five when $X=30°$ and $Y=15°$. A pattern in which $X=30°$ and $Y=15°$ is shown in FIG. 21.

When any pattern produced in accordance with the invention is observed, the observer sees an array of highlights whose position depends upon the location of the observer's eye and the location of the source of illumination. The area of each highlight and the spacing between the highlights is determined by the length of the period of cyclical variation. When $X=30°$, and the period of cyclical variation is a minimum number of relief elements, each highlight consists of an individual facet, and the highlights appear to jump intermittently from one relief element to the next upon any relative motion in the three-element optical system consisting of a light source, the pattern and the observer's eye. If the pattern is chosen so that the period of cyclical repetition is greater, then the highlights spread over facets on a large number of adjacent relief elements, the number of facets observed in any one highlight increasing as the period of cyclical repetition increases. Furthermore, the spacing between these larger highlights also increases in the same manner. These larger highlights move smoothly, rather than jumping, as the pattern moves with respect to the observer's eye. For a given speed of relative movement of the pattern, larger highlights move slower than smaller highlights. Advantage may be taken to this effect to produce an ornamental pattern consisting of adjacent areas, one of which has small, fast moving highlights and the other has large, slow moving highlights. Thus, a substantial contrast can be produced between the appearances of the two areas, without the observer being aware of the mechanism which creates this contrast.

FIG. 16 illustrates a different and more startling form of contrast which may be secured through the use of the present invention. As explained in connection with FIG. 13, the pattern illustrated in the left-hand half of FIG. 16 is part of the pattern area 14a of FIG. 13, and is thus similar in every way to the pattern of FIG. 14. The right-hand half of FIG. 16 is a portion of the pattern area 14b of FIG. 13. This pattern area differs from the pattern area 14a in that the rows of the superimposed hexagons, resulting from the hemispheres of the superimposed pressure sheet, are shifted clockwise with respect to the rows of relief elements on the underlying pattern rather than being shifted counter-clockwise, as in the case of FIG. 14 and the left-hand half of the pattern area. In each of these pattern areas 14a and 14b, there is produced an array of highlights, two of which may be seen at 24 and 25 in FIG. 16. The particular distinctive contrast that is produced by the juxtaposition of the two pattern areas 14a and 14b derives from the fact that upon any relative motion between the pattern area and either the observer's eye or the source of illumination, the highlights will move in one direction in the pattern area 14a and in the opposite direction in the pattern area 14b.

An exact optical theory to account for this opposite direction of movement of the highlights has not been determined. It is known, however, that it does derive from the angle of displacement of the two cooperating generating patterns, and that the direction of movement is determined by the direction of that angular displacement. The direction of movement of the highlights does not change with a change in the orientation of the pattern area with respect to the observer's eye. Furthermore, considering the two sheets of material 5, in FIGS. 6 to 9, the direction of movement of the highlights is the same in both of the two sheets of material 5. The only way that the opposite direction of movement of the highlights can be secured is by shifting the superimposed sheet in the opposite angular direction with respect to the underlying sheet. This opposite direction of movement is scarcely observable when the angle X between the two generating patterns is near 30° (or one-half of the angle between the center lines of intersecting rows of relief elements). It quickly becomes prominent, however, as the angle X is changed away from 30° and is quite pronounced until the angle X becomes very small, approaching zero. Whatever the angle $n$ between intersecting rows of relief elements, the angle of displacement X can never be greater than $n/2$. In the present instance, where $n=60°$, X cannot be greater than 30°. If the displacement in one direction, e.g., counter-clockwise, is greater than 30°, it becomes equivalent to a clockwise displacement of less than 30° in the opposite direction. For example, a displacement in the counter-clockwise direction of 35°, is equivalent to a clockwise movement of 25°.

FIG. 17 shows a cross-sectional view along the line 17—17 of FIG. 16, and illustrates the profile of that pattern. FIG. 18 illustrates the negative profile of that same pattern, i.e., the profile of the embossing plate which produced it. It might be desired to make an embossing plate with the profile of FIG. 17, in which case the ornamented surface would have the profile of FIG. 18. However, the small projections in the profile of FIG. 18 are structurally weak and likely to be damaged by wear and impact, so that an ornamental surface which might be subject to wear and impact would not normally be constructed with the profile of FIG. 18.

The master surface for making an embossing tool for reproducing the pattern of FIG. 13 having the contrasting design areas 14a and 14b may be constructed by first making separate reproductions of patterns corresponding to the areas 14a and 14b. These reproductions are preferably made in unsupported plastic materials such as the plastic sheets 5 of FIG. 9, and are conveniently made in separate pieces. Next, one of the pieces is cut into a design area shaped like the area 14a and the other piece is cut into a design area shaped like the area 14b. The two sections are then assembled and are bonded together at their edges. Care must be taken in the cutting and bonding operations that the sections fit snugly together without interstices and that the bonding operation does not mar the pattern.

The solid line arrows 29 in FIG. 13 show the direction in which the highlights in the two pattern areas move when the sheet is moved in one direction with respect to the eye of an observer, or when a specific directional displacement takes place in the optical system including the observer's eye, the pattern, and the light source. The dotted line arrows 30 illustrate the direction in which the same highlights move when the opposite directional displacement takes place between any two elements of that optical system. Note that the highlights in area 14a always appear to move in the opposite direction to those in area 14b.

FIGS. 19 TO 21

FIG. 19 illustrates a pattern similar to that of FIG. 14, except that the angle $X=12°$ and $Y=6°$. FIG. 20 illustrates a pattern similar to FIG. 19, except that the angle $X=15°$ and $Y=7.5°$.

FIG. 21 illustrates a pattern similar to that of FIG. 14 except that the angle of displacement X is 30°, and the facet-row angle Y is 15°. Note that the center line 20 along one row of relief elements intersects at an angle of 60° the center line 30 along an intersecting row of relief elements, the common relief element in both rows being element 31. The angle of displacement X may be measured counter-clockwise from the center line 20 to the center line 32, or it may be measured clockwise from the center line 30 to the center line 32. The facet-row angle Y in each case is one-half of the angle of displacement X, as shown in the drawing. Thus, the facet-row angle Y may be either the angle between the center lines 20 and 33 or between the center lines 30 and 34.

In order to measure the facet-row angle in FIG. 21, one first selects a particular relief element, such as element 35 and a particular facet on that element, such as element 35a. The centroid of the facet 35a is located, as at 35b. Then, proceeding along the vertical row of relief elements including the element 35, the next adjacent relief element is the element 36. The facet of relief element 36 whose orientation most nearly corresponds to that of facet 35a is the facet 36a which has a centroid located at 36b. The centroids 35b and 36b define the center line 33. That line, together with the center line 37 through the vertical row of relief elements defines the facet-row angle Y.

If, instead of proceeding downwardly from relief element 35 to relief element 36, one proceeded upwardly to relief element 55, it would appear that the facet of that relief element whose orientation most nearly corresponded to that of facet 35a, is the facet 55a. Facet 55a has a centroid 55b. A line 56 drawn through centroids 55b and 35b intersects the center line 37 at an angle Y. Line 56 is displaced clockwise from center line 37, whereas line 33 is displaced counter-clockwise. This double set of facet-row center lines is typical of patterns constructed in accordance with the invention where angle $X=30°$, or nearly 30°. As the angle X departs from 30°, one of the sets of facet-row center lines becomes very difficult to observe, while the other set stands out predominantly, as in FIG. 14.

FIGS. 22 TO 26

FIG. 22 illustrates a cross-sectional view of material formed either according to the method of FIGS. 10 and 11 or with the embossing rolls of FIG. 12. In other words, FIG. 22 shows an embossed sheet 26 which may correspond either to the embossed sheet 10 of FIG. 11 or the sheet 11 which is being embossed in FIG. 12. The upper surface of the embossed sheet 26 is similar to the embossed surface of the material in FIG. 17. The lower surface of the sheet 26 is similar to the embossed surface of the sheet material shown in FIG. 18. It may be observed that the pattern of FIG. 22 differs from that in the patterns of FIGS. 17 and 18, in that the angles are less sharp. The thin sheet material 26 has a substantial elasticity which tends to restore it to the form of a thin flat sheet after the embossing is over. While this restoring action is not complete, nevertheless, it has the effect of softening all the angles in the pattern and making them more-or-less curved.

FIG. 23 shows in plan view the pattern of the thin sheet material 26 in FIG. 22. It may be observed that the circles which define the separate relief elements in the patterns of FIGS. 14 to 21 have substantially disappeared, and that the individual relief elements are defined instead by generally hexagonal figures. A fragment of this material is illustrated on a greatly enlarged scale in FIG. 24. Correspondingly enlarged cross-sectional views appear in FIGS. 25 and 26.

Figure 24:
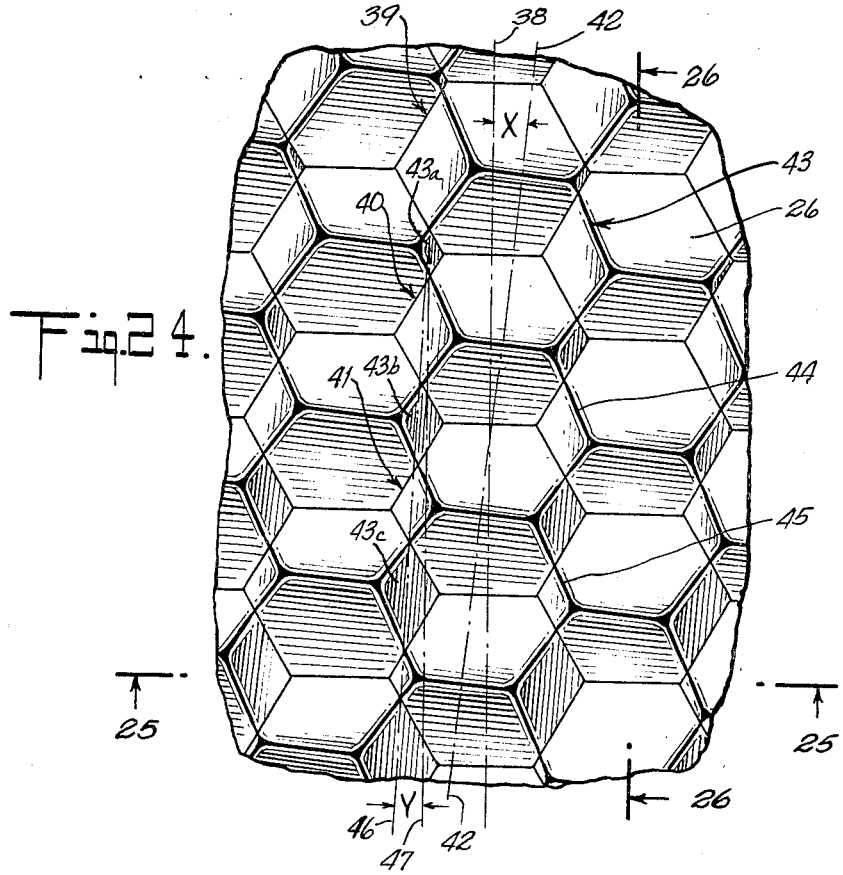
FIG. 24 is a view similar to FIG. 23, but on a greatly enlarged scale.
Figure 25:
FIG. 25 is a cross-sectional view taken on the line 25—25 of FIG. 24.
Figure 26:
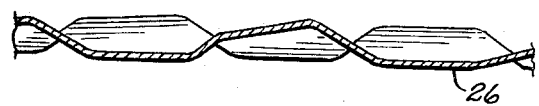
FIG. 26 is a cross-sectional view taken on the line 26—26 of FIG. 24.

In FIG. 24, the center line 38 is the line through the centers of a row of hexagons 39, 40, 41. The center line 42 passes through the centers of an overlapping row of hexagons 43, 44, 45. The angle of displacement X appears between the center lines 38 and 42. The facet-row angle Y may be measured by a line 46 drawn through the centroids of facets 43a, 43b, and 43c and a line 47 parallel to the center line 38. The parallel line 47 is used for convenience only. If the figure were sufficiently extended, the line 46 would intersect the center line 38 at the same angle at which it intersects the line 47. It may be seen that the facet-row angle Y is approximately 4°, being one-half of the angle of displacement X, which is approximately 8°.

FIG. 27

FIG. 27 illustrates in a somewhat diagrammatic fashion, a pattern in which the underlying rows of relief elements are curved, while the overlying superimposed relief elements which produced the facets remain straight. Such a pattern has an array of highlights which are irregular in contour, rather than having the hexagonal shape which is characteristic of the highlights in the patterns of FIGS. 14 to 21. The highlights are nevertheless spaced and will move across the pattern in accordance with the laws determining the direction of movement, as described in connection with FIG. 16. The underlying curved pattern may be produced by hand, as may any of the patterns disclosed herein. Alternatively, a set of two sheets of superimposed irregularly curved patterns may be produced by using the method of FIGS. 6 to 9 and increasing the pressure and temperature somewhat beyond the normal limits, so that the plastic material tends to flow irregularly while it is held between the pressing plates.

FIG. 28

This figure illustrates a pattern in which the relief elements 26 are arranged in rows which intersect each other at angles of 90°, rather than angles of 60°. Hence, the critical angle of displacement between the generating patterns at which the period of cyclical repetition of the facets reaches a minimum is 45° rather than 30°.

FIGS. 29 TO 33

These figures illustrate, on a somewhat smaller scale, the spacing between the highlights in the patterns of FIGS. 14, 19, 20, 27 and 28, respectively. It may be seen that in the pattern of FIGS. 14 and 29, the highlights are rather widely spaced. In the pattern of FIGS. 19 and 30, the highlights are more closely spaced, and are still more closely spaced in the pattern of FIGS. 20 and 31.

FIG. 32 illustrates the irregular contours and distribution of the highlights which are produced by the pattern of FIG. 27, the highlights being illustrated at 27.

FIG. 33 illustrates the array of highlights encountered with the pattern of FIG. 28. Note that the highlights are arranged at corners of squares rather than being arranged at the corners of triangles, as in FIGS. 29, 30 and 31, 26. It should be understood that different arrays of generating relief elements may be used in accordance with the invention. Furthermore, the individual generating relief elements need not be hemispheres but may have other contours.

After a pattern has once been formed by one of the processes described in connection with FIGS. 1 to 12, it can be duplicated by simply electroforming a sample of the completed product, thereby producing a stiff metal plate which may serve as the face of an embossing roll having the same contour.

FIGS. 34 TO 37

These figures illustrate patterns formed in accordance with a modification of the invention and the process by which these modified patterns are produced.

Referring to FIG. 34, there is shown a pair of pressing plates 50 and 51 carrying respective ones of a pair of embossing plates 52 and 53. The embossing plates 52 and 53 are similar to the embossing plates 5 of FIG. 11, except that the patterns formed on the surfaces of plates 52 and 53 are defined by rows of hemispherical recesses 52a and 53a. The rows of recess 53a in the plate 53 are skewed with respect to the plane of the paper, so that the recesses do not all appear to be of the same diameter in the figure. Compare the lower embossing plate 5 in FIG. 11.

A thin sheet 54 of material to be embossed is inserted between the plates 52 and 53. The two pressing plates 50 and 51 are then moved toward one another, squeezing the sheet 54 between the plates 52 and 53. Note that the plates 52 and 53 forcibly engage the sheet 54 only at spaced points, represented by the crossing points of the ridges between the hemispherical recesses 52a and 53a. Thus, the sheet material 54 is stretched across a succession of ridges, some above and some below the plate, and is only occasionally squeezed forcibly between abutting surfaces located directly opposite each other above and below the sheet material. The resulting pattern formed in the sheet material 54 is shown in plan view in FIG. 36, and in cross-sectional view in FIG. 37. The structure is generally similar to that illustrated in FIGS. 24 to 26, except that the corners and ridges are even more rounded and the peaks and valleys are considerably less sharp. The material so formed has all the characteristics of other materials constructed in accordance with the invention, including the arrays of moving highlights described above.

Any of the patterns disclosed herein, whether formed in relatively thick material, backed or unbacked, having only one surface embossed, as in the case of FIGS. 17 and 18, or whether formed in thin material having both surfaces embossed, as in the case of the materials of FIGS. 22 and 25 to 37, may be reproduced by electroforming from an original impression of the pattern. Thus, once a pattern has been originated by the methods illustrated above, it can be reproduced by an electroforming process well known in the art, without using the pattern generating methods described above.

When an embossing tool carrying such a pattern has been made, by electroforming or otherwise, the pattern can then be reproduced in any suitable material. For example, one of the patterns generated in a thin sheet above could be reproduced in a thick vinyl plastic layer supported on cotton duck, or vice versa.

In the foregoing description, certain visual effects as to the movement of highlights are mentioned as taking place upon relative movement between any two elements of the three-element optical system consisting of a light source, the ornamented surface, and the eye of an observer. In order to simplify the claims, it is stated therein that such a visual effect takes place upon relative movement between the surface and the eye of the observer. Note that this positive statement that the effect takes place upon this particular relative movement does not contradict the statement that the effect also takes place upon certain other relative movements, as mentioned in the specification.

While I have shown and described certain preferred embodiments of my invention, other modifications thereof will readily occur to those skilled in the art, and I therefore intend my invention to be limited only by the appended claims.

I claim:
1. A material having in at least one surface thereof:
    (a) an area substantially covered by an array of relief elements integral with said material and arranged in intersecting rows;
    (b) said relief elements being contoured so that substantially all of them have at least one light reflecting facet;
    (c) each facet of each relief element differing in contour from every facet of every next adjacent relief element; and
    (d) each facet of a relief element being oriented in a direction differing from all other facets thereof.
2. A material as defined in claim 1, in which said contour difference between facets of adjacent relief elements in a row varies progressively along said row.
3. A material as defined in claim 1, in which said contour difference between facets of adjacent relief elements in a row varies cyclically along said row, so as to produce to the eye of an observer an array of highlights spaced along said row.
4. A material as defined in claim 1, in which said contour difference between facets of adjacent relief elements in a row varies progressively and cyclically along said row, so that upon relative movement between said surface and the eye of an observer, an array of highlights appears to the observer to move progressively along the row.
5. A material as defined in claim 1, in which the contour difference between the facets of adjacent relief elements comprises a difference as to area.

6. A material as defined in claim 1, in which the contour difference between the facets of adjacent relief elements comprises a difference as to tilt.

7. A material as defined in claim 1, in which the contour difference between the facets of adjacent relief elements comprises a difference as to shape.

8. A material as defined in claim 1, in which the contour difference between the facets of adjacent relief elements comprises a difference as to orientation.

9. A material as defined in claim 1, in which:
(a) said relief elements are arranged in a plurality of contiguous rows; and
(b) the contour difference between facets of adjacent relief elements varies progressively and cyclically along each row, with the phase of the variation of the contour difference of each row being shifted with respect to the variation in the adjacent rows.

10. A material as defined in claim 2, in which:
(a) the center lines of the intersecting rows of relief elements define an angle $n$; and
(b) the progressive difference in contour of the facets comprises an angular displacement no greater than $n/4$ between the center line of any row and a line through the centroids of correspondingly oriented facets on successive relief elements along that row.

11. A material as defined in claim 10, in which:
(a) the line through the centroids of the correspondingly oriented facets is displaced clockwise from the center line of the row in said area; and
(b) said material has a second area similar to the first-mentioned area and contrasting therewith in that the angular displacement of the line through the centroids of correspondingly oriented facets is displaced counterclockwise from the center line of the row, so that upon relative movement between said surface and the eye of an observer, an array of highlights appears to the observer to move in one direction across said first-mentioned area and another array of highlights appears to move in a contrasting direction in said second area.

12. A material as defined in claim 10, having a second area similar to the first-mentioned area and contrasting therewith in that the angular displacement of the line of centroids of the correspondingly oriented facets from the center line of the row is different from the angular displacement in said first-mentioned area, so that each of said areas has an area of highlights apparent to an observer, with the spacings between the highlights different in the second area than in the first-mentioned area.

13. A material as defined in claim 1, in which:
(a) said relief elements are arranged in contiguous rows and have substantially equal base cross-sectional areas; and
(b) the contour difference between facets of adjacent relief elements varies progressively and cyclically along each row.

14. A material as defined in claim 13, in which the rows are arranged to produce intersecting rows of relief elements whose center lines define an angle of 60°.

15. A material as defined in claim 1, in which the said relief elements are protuberances.

16. A material as defined in claim 1, in which said relief elements are depressions.

17. A material as defined in claim 1, in which said relief elements are arranged in contiguous curved rows.

References Cited

UNITED STATES PATENTS

| | | | |
|---|---|---|---|
| 1,424,642 | 8/1922 | Hanlon | 350—286 X |
| 2,561,147 | 7/1951 | Smith | 161—130 X |
| 2,676,518 | 4/1954 | Rupert | 350—103 |
| 3,003,599 | 10/1961 | Rubissow | 161—125 |
| 3,096,032 | 7/1963 | Davis | 240—106 |
| 3,312,006 | 4/1967 | Rowland | 350—167 X |
| 3,353,897 | 11/1967 | Lemelson | 350—167 |
| 3,357,772 | 12/1967 | Rowland | 350—167 |
| 3,414,459 | 12/1968 | Wells | 161—131 |
| 3,421,805 | 1/1969 | Rowland | 350—167 X |

ROBERT F. BURNETT, Primary Examiner

W. W. SCHWARZE, Assistant Examiner

U.S. Cl. X.R.

161—130; 350—109, 167